United States Patent Office 2,774,674
Patented Dec. 18, 1956

2,774,674
ANTI-ADHESION COMPOSITIONS

Jean René Dumas, Venissieux, France, assignor to Societe des Usines Chimiques Rhone-Poulenc, Paris, France, a French body corporate No Drawing. Application August 30, 1954, Serial No. 453,151

Claims priority, application France September 3, 1953

4 Claims. (Cl. 106—2)

This invention relates to anti-adhesion compositions and more particularly to such compositions based on organopolysiloxanic oils.

In order to increase the resistance of porous surfaces to the adhesion of substances which normally adhere thereto (for example, to increase the resistance of materials of fibrous nature, such as paper, board or fabrics, to the adhesion of asphalts, bitumen, tars, waxes, paraffin solids, flour-containing pastes and frozen foodstuffs), it is known to treat the surfaces with a methylhydrogenopolysiloxane in aqueous emulsion or in solution in an organic solvent. It has also been proposed, for the purpose of improving its anti-adhesion properties, to incorporate in the methylhydrogenopolysiloxane an aqueous solution of a cellulose ether. However, these processes have the disadvantages that the methylhydrogenopolysiloxanes have in the first place a low stability in aqueous solution and, secondly, necessitate, in order to provide a good anti-adhesion effect, a heat treatment to complete their polymerisation.

The use of organopolysiloxanic oils alone for the purpose of imparting anti-adhesion properties to porous substances is, moreover, restricted because their anti-adhesion effect is frequently inadequate and gives rise to problems which have not as yet been solved. When employed in the form of pastes prepared by thickening them with a siliceous filler, the polysiloxanic oils can only be applied in relatively thick and therefore costly layers. Further, if such pastes are dispersed in an organic liquid, e. g. trichloroethylene or white spirit, the solvent must be evaporated after the application of the product and it is found in addition that if the surface is not previously dressed with a suitable product the paste is absorbed within the porous surface. In industry, emulsions of these pastes in water, which are prepared with the aid of emulsifiers and in some cases of a polyethylene glycol, are also employed to prevent rubber or thermoplastic or thermosetting materials from adhering to metal vulcanising moulds or to injection presses, but these products have insufficient anti-adhesion properties when they are directly applied to porous supports such as paper.

It is an object of the present invention, to provide new anti-adhesion compositions based on organopolysiloxanic oils, which are free from the aforesaid disadvantages.

According to the present invention a composition of matter having the property of imparting to a surface to which it is applied a resistance to the adhesion of other substances, comprises an aqueous dispersion of at least one organopolysiloxanic oil containing a mineral filler, an emulsifier and a small quantity of an alkali salt of an organosilane-triol. Preferably the water content of the compositions is at least 15% and advantageously more than 20% by weight.

The organopolysiloxanic oils employed in the preparation of the compositions of the present invention are polysiloxanes containing hydrocarbon groups such as alkyl, aryl or aralkyl groups or several different such groups, linked to silicon atoms, the ratio of the number of hydrocarbon groups to the number of silicon groups being in the neighbourhood of 2. The preferred oils are dimethylpolysiloxanic oils. The viscosity is of little importance, but in practice the current commercial products will be used, the viscosity of which at 25° C. lies between 100 and 1000 centistokes. Mixtures of oils may be employed.

As mineral filler, there is preferably employed a finely divided siliceous filler, if desired in mixture with other finely divided fillers. The siliceous filler may be prepared by any known process, e. g. by the wet method or, preferably, by combustion of silicic acid derivatives. Preferably the filler is present in a proportion from 20 to 70 parts by weight, and advantageously about 40 parts by weight, to 100 parts by weight of organopolysiloxanic oil.

The choice of the emulsifier presents no difficulty. A non-ionic emulsifier (for example an alkylated aryl polyether alcohol) is preferably employed, but emulsifiers containing active ions (for example a sodium salt of decyl or dodecyl benzene sulphonic acid) may be added. The quantities incorporated preferably vary from 15 to 55 parts by weight and advantageously about 30 parts by weight to 100 parts by weight of the mixture of polysiloxanic oil and mineral filler.

As the alkali salt of an organosilane-triol, the sodium salt of methylsiliconic acid is preferred. The quantity of sodium methysiliconate added preferably varies from 0.5 to 20 parts by weight and advantageously from 2 to 8 parts by weight to 100 parts by weight of the mixture of organopolysiloxanic oil and filler.

The compositions according to the invention may be prepared in any convenient manner. One convenient method is to prepare a paste by mixing together the oil or the mixture of organopolysiloxanic oils and the mineral filler and to disperse the paste thus obtained in water in the presence of the emulsifier and the alkali salt of organosilane-triol, which may be introduced in the form of an aqueous solution. Corrosion inhibitors, such as sodium nitrite, may be added if desired.

The compositions according to the invention may be diluted with water and their consistency may be varied from the paste state to the fluid state simply by adjusting the quantity of added water. If the composition contains from 20% to 40% by weight of water, it has the form of an unctuous paste, the consistency of which, measured on the ASTM penetrometer, is from 250 to 300, and which may be applied to paper by the usual method of coating by rollers. On adding water to this paste, a more fluid product is obtained, which can then be applied to the surfaces to be treated by other methods such as dipping, brushing or spraying.

The quantity of product necessary to obtain good resistance to adhesion varies in accordance with the nature of the support treated and the product against which the anti-adhesive properties are required, but has been found to be consistently much smaller than the quantities employed in the known processes to obtain a comparable anti-adhesion effect. For example, in the case of the treatment of a kraft paper, from 5 to 10 g. per square metre of compositions according to this invention containing from 25% to 35% of water (3.25 to 7.5 g./sq. metre dry coating weight) are sufficient to prevent the adhesion of tar. A similar treatment may be applied to papers for lining pastry moulds. Papers treated with the compositions according to the invention are resistant to the high temperatures to which they are exposed, for example, in the pouring of tar, or in the baking of pastry.

The following examples will serve to illustrate the invention, but are not to be regarded as limiting it in any way. The parts given are by weight.

Example I 3600 parts of a paste obtained by mixing 2600 parts of dimethylpolysiloxane oil having a viscosity of 300 centistokes, and 1000 parts of silica aerogel are introduced into a mixer. 900 parts of a non-ionic emulsifier are added during 5 minutes at room temperature and mixing is continued for 25 minutes to homogenise the mass. To the pastry product are added 72 parts of sodium methylsiliconate (45% dry solid) in solution in 1080 parts of water. The mixing is continued for 20 minutes and 384 parts of water are finally added during 15 minutes. After mixing for one hour, a shiny unctuous homogeneous paste is obtained, the consistency of which is 265, measured on the ASTM penetrometer. This paste may be diluted with water in any proportion, but it retains its pasty consistency only with water contents not exceeding 40% by weight of the composition.

Example II 700 parts of silica aerogel are introduced into a mixer and 1800 parts of a dimethylpolysiloxane oil having a viscosity of 290 centistokes at 25° C. are added in 7 minutes with agitation.

After mixing from 20 minutes, 625 parts of a non-ionic emulsifier are added and, after a further 20 minutes, 750 parts of an aqueous solution containing 250 parts of an ionic emulsifying agent are added. After several more minutes, 400 parts of an aqueous solution containing 100 parts of sodium methylsiliconate (45% dry solid) are run in and after mixing for 10 minutes, 1250 parts of water are added. The mixing is continued for one hour when a translucent shiny paste is obtained, the consistency of which is 288 as measured on the ASTM penetrometer. It may be diluted by incorporating water in any proportion.

In order to show the anti-adhesion action of the compositions according to the invention, the following comparative tests were made:

Sheets of kraft paper weighing 70 g. per square metre were coated with various compositions based on organopolysiloxane oil so as to leave on the paper a quantity corresponding to 6.5 g. per square metre of organopolysiloxane oil plus the filler.

Sheet A was treated with a composition consisting of a mixture of organopolysiloxane oil and silica in the proportion of 180 parts of oil to 70 parts of silica.

Sheet B was treated with the same composition as for sheet A but diluted with its own weight of trichloroethylene.

Sheet C was treated with an aqueous composition identical to that prepared in Example I, but containing no sodium methylsiliconate.

Sheet D was treated with the composition prepared in Example I.

Sheet E was treated with the composition prepared in Example II.

The water and the organic solvent, when present on the sheets, were removed by rapid drying at 60° C. Molten bitumen at 250° C. was poured on the sheets and allowed to cool. On attempting to detach the bitumen from the various paper specimens treated, it is found in the case of Sheets A, B, and C the paper was torn in places, while at other places traces of bitumen remained on the paper. On the other hand, the bitumen detaches readily from Sheet D and E treated with the compositions according to the present invention, and there was no tearing of the paper, even though the bitumens used in the test were grades known for their strong adhesive qualities.

I claim:

1. A composition of matter having the property of imparting to a surface to which it is applied a resistance to the adhesion of other substances, which consists essentially of an aqueous dispersion of at least one organopolysiloxanic oil containing at least 15% by weight of water, finely divided silica in a proportion of 20–70% by weight of the total organo-polysiloxanic oil present, an emulsifier in a proportion of 15–55% by weight of the total of organo-polysiloxanic oil and the silica, and an alkali salt of an organo-silane-triol in a proportion of 0.5 to 20% by weight of the total of organo-polysiloxanic oil and silcia.

2. A composition of matter having the property of imparting to a surface to which it is applied a resistance to the adhesion of other substances, which consists essentially of an aqueous dispersion of a dimethylpolysiloxanic oil containing at least 15% by weight of water, finely divided silica in a proportion of 20–70% by weight of the said oil present, a non-ionic surface-active compound in a proportion of 15–55% by weight of the total oil and silica, and sodium methyl siliconate in a proportion of 0.5 to 20% by weight of the total oil and silica.

3. A process for imparting anti-adhesion properties to a porous surface which comprises coating said surface with 3.25 to 7.5 g./sq. metre calculated as dry weight of an aqueous dispersion of at least one organo-polysiloxanic oil containing at least 15% by weight of water, finely divided silica in a proportion of 20–70% by weight of the total organo-polysiloxanic oil present, an emulsifier in a proportion of 15–55% by weight of the total of organopolysiloxanic oil and the silica, and an alkali salt of an organo-silane-triol in a proportion of 0.5 to 20% by weight of the total of organo-polysiloxanic oil and silica.

4. A process for imparting anti-adhesion properties to a porous surface which comprises coating said surface with 3.25 to 7.5 g./sq. metre calculated as dry weight an aqueous dispersion of a dimethylpolysiloxanic oil containing at least 15% by weight of water, finely divided silica in a proportion of 20–70% by weight of the said oil present, a non-ionic surface-active compound in a proportion of 15–55% by weight of the total oil and silica, and sodium methyl siliconate in a proportion of 0.5 to 20% by weight of the total oil and silica.

References Cited in the file of this patent
UNITED STATES PATENTS

| | | |
|---|---|---|
| 2,507,200 | Elliott et al. | May 9, 1950 |
| 2,523,281 | Currie | Sept. 26, 1950 |
| 2,584,413 | Baer et al. | Feb. 5, 1952 |